(12) United States Patent
Imhof

(10) Patent No.: US 9,366,772 B2
(45) Date of Patent: Jun. 14, 2016

(54) METHOD FOR CREATING A HIERARCHICALLY LAYERED EARTH MODEL

(75) Inventor: Matthias Imhof, Katy, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 574 days.

(21) Appl. No.: 13/500,557

(22) PCT Filed: Oct. 8, 2010

(86) PCT No.: PCT/US2010/051902
§ 371 (c)(1),
(2), (4) Date: Apr. 5, 2012

(87) PCT Pub. No.: WO2011/056347
PCT Pub. Date: May 12, 2011

(65) Prior Publication Data
US 2012/0209526 A1  Aug. 16, 2012

Related U.S. Application Data

(60) Provisional application No. 61/258,405, filed on Nov. 5, 2009.

(51) Int. Cl.
*G01V 3/38* (2006.01)
*G01V 1/40* (2006.01)
*G01V 1/30* (2006.01)

(52) U.S. Cl.
CPC ..................................... *G01V 1/306* (2013.01)

(58) Field of Classification Search
CPC ....... G01V 11/00; G01V 1/282; G01V 1/364; G01V 1/306; G01V 1/40

USPC ............... 702/5, 2, 11, 14; 382/109, 108, 19; 166/369

See application file for complete search history.

(56) References Cited

U.S. PATENT DOCUMENTS

| 4,916,615 A | 4/1990 | Chittineni |
| 4,992,995 A | 2/1991 | Favret |
| 5,047,991 A | 9/1991 | Hsu |

(Continued)

FOREIGN PATENT DOCUMENTS

| WO | WO 99/64896 | 12/1999 |
| WO | WO 01/84462 | 11/2001 |

(Continued)

OTHER PUBLICATIONS

Dennie Reniers, Alexandru Telea; Skeleton-based Hierarchical Shape Segmentation; 2007, IEEE International Conference on Shape Modeling and Applications(SMI'07), pp. 1-10.*

(Continued)

*Primary Examiner* — Gregory J Toatley
*Assistant Examiner* — Eman Alkafawi
(74) *Attorney, Agent, or Firm* — ExxonMobil Upstream Research Co. Law Dept.

(57) ABSTRACT

Method for segmenting a geophysical data volume such as a seismic data volume (10) for ranking, prioritization, visualization or other analysis of subsurface structure. The method takes any initial segmentation (11) of the data volume, and progressively reduces the number of segments by pair combination (13) so that an optimal stage of combination may be determined and used for analysis (15).

21 Claims, 11 Drawing Sheets

(56) References Cited

U.S. PATENT DOCUMENTS

| | | | |
|---|---|---|---|
| 5,265,192 A | 11/1993 | McCormack | |
| 5,274,714 A | 12/1993 | Hutcheson et al. | |
| 5,416,750 A | 5/1995 | Doyen et al. | |
| 5,444,619 A | 8/1995 | Hoskins et al. | |
| 5,465,308 A | 11/1995 | Hutcheson et al. | |
| 5,539,704 A | 7/1996 | Doyen et al. | |
| 5,563,949 A * | 10/1996 | Bahorich et al. | 702/16 |
| 5,586,082 A | 12/1996 | Anderson et al. | |
| 5,852,588 A | 12/1998 | de Hoop et al. | |
| 5,940,777 A | 8/1999 | Keskes | |
| 6,052,650 A | 4/2000 | Assa et al. | |
| 6,226,596 B1 | 5/2001 | Gao | |
| 6,236,942 B1 | 5/2001 | Bush | |
| 6,278,949 B1 | 8/2001 | Alam | |
| 6,295,504 B1 | 9/2001 | Ye et al. | |
| 6,363,327 B1 | 3/2002 | Wallet et al. | |
| 6,411,903 B2 | 6/2002 | Bush | |
| 6,438,493 B1 | 8/2002 | West et al. | |
| 6,466,923 B1 | 10/2002 | Young | |
| 6,473,696 B1 | 10/2002 | Onyia et al. | |
| 6,560,540 B2 | 5/2003 | West et al. | |
| 6,574,566 B2 | 6/2003 | Grismore et al. | |
| 6,597,994 B2 | 7/2003 | Meek | |
| 6,618,678 B1 | 9/2003 | Van Riel | |
| 6,625,541 B1 | 9/2003 | Shenoy et al. | |
| 6,631,202 B2 | 10/2003 | Hale | |
| 6,725,163 B1 | 4/2004 | Trappe et al. | |
| 6,735,526 B1 | 5/2004 | Meldahl et al. | |
| 6,757,614 B2 | 6/2004 | Pepper et al. | |
| 6,804,609 B1 | 10/2004 | Brumbaugh | |
| 6,847,895 B2 | 1/2005 | Nivlet et al. | |
| 6,912,467 B2 | 6/2005 | Schuette | |
| 6,941,228 B2 | 9/2005 | Toelle | |
| 6,950,786 B1 | 9/2005 | Sonneland et al. | |
| 6,957,146 B1 | 10/2005 | Taner et al. | |
| 6,970,397 B2 | 11/2005 | Castagna et al. | |
| 6,988,038 B2 | 1/2006 | Trappe et al. | |
| 7,024,021 B2 | 4/2006 | Dunn et al. | |
| 7,145,570 B2 | 12/2006 | Emberling et al. | |
| 7,162,463 B1 | 1/2007 | Wentland et al. | |
| 7,184,991 B1 | 2/2007 | Wentland et al. | |
| 7,188,092 B2 | 3/2007 | Wentland et al. | |
| 7,222,023 B2 | 5/2007 | Laurent et al. | |
| 7,243,029 B2 | 7/2007 | Lichman et al. | |
| 7,248,258 B2 | 7/2007 | Acosta et al. | |
| 7,248,539 B2 | 7/2007 | Borgos et al. | |
| 7,257,772 B1 | 8/2007 | Bishop et al. | |
| 7,295,706 B2 | 11/2007 | Wentland et al. | |
| 7,295,930 B2 | 11/2007 | Dulac et al. | |
| 7,308,139 B2 | 12/2007 | Wentland et al. | |
| 7,453,767 B1 | 11/2008 | Padgett | |
| 7,463,552 B1 | 12/2008 | Padgett | |
| 7,925,481 B2 * | 4/2011 | Van Wagoner et al. | 703/10 |
| 8,027,517 B2 | 9/2011 | Gauthier et al. | |
| 8,103,060 B2 | 1/2012 | Abe | |
| 8,577,130 B2 * | 11/2013 | Dewan et al. | 382/159 |
| 2003/0193838 A1 * | 10/2003 | Dunn et al. | 367/68 |
| 2003/0200030 A1 | 10/2003 | Meldahl et al. | |
| 2004/0062145 A1 * | 4/2004 | Dunn et al. | 367/72 |
| 2004/0098200 A1 | 5/2004 | Wentland et al. | |
| 2004/0153247 A1 * | 8/2004 | Czernuszenko et al. | 702/14 |
| 2005/0171700 A1 | 8/2005 | Dean | |
| 2005/0288863 A1 | 12/2005 | Workman | |
| 2006/0184488 A1 | 8/2006 | Wentland et al. | |
| 2007/0036434 A1 | 2/2007 | Saveliev | |
| 2008/0008369 A1 | 1/2008 | Koptenko et al. | |
| 2008/0140319 A1 | 6/2008 | Monsen et al. | |
| 2008/0170756 A1 | 7/2008 | Beucher et al. | |
| 2008/0243749 A1 | 10/2008 | Pepper et al. | |
| 2009/0102840 A1 | 4/2009 | Li | |

FOREIGN PATENT DOCUMENTS

| | | |
|---|---|---|
| WO | WO 2009/082563 | 7/2009 |
| WO | WO 2009/142872 | 11/2009 |
| WO | WO 2011/005353 | 1/2011 |

OTHER PUBLICATIONS

Faucon, T. et al. (2005), "Morphological Segmentation Applied to 3D Seismic Data," *Mathematical Morphology: 40 Years On, Computational Imaging and Vision* (30), pp. 475-484.

Faucon, T. et al. (2006), "Application of Surface Topological Segmentation to Seismic Imaging," *Continuous Level of Detail on Graphics Hardware*, Lecture Notes in Computer Science (4245), pp. 506-517.

Fernandez, M. et al. (2000), "Texture Segmentation of a 3D Seismic Section with Wavelet Transform and Gabor Filters," 15th Int'l. Conf. on Pattern Recognition, pp. 354-357.

Hale, D. et al. (2002), "Atomic Meshing of Seismic Images," *SEG Expanded Abstracts* (21), pp. 2126-2129.

Hale, D. et al. (2003), "Seismic interpretation using global image segmentation," *SEG Expanded Abstracts* (22), pp. 2410-2413.

Kadlec, B.J. et al. (2008), "Confidence and Curvature-Guided Level Sets for Channel Segmentation," *SEG Expanded Abstracts* (27), pp. 879-883.

Lomask, J. et al. (2007), "Application of Image Segmentation to Tracking 3D Salt Boundaries," *Geophysics* (72), pp. P47-P56.

Momsen, E. et al. (2002), "Segmentation of Seismic Data with Complex Stratigraphy Using Watershedding—Preliminary Results," IEEE 10th Digital Signal Processing Workshop, and the 2nd Signal Processing Education Workshop, pp. 68-71.

Momsen, E. et al. (2005), "Multi-scale volume model building," *SEG Expanded Abstracts* (24), pp. 798-801.

Patel, D. et al. (2008), "The Seismic Analyzer: Interpreting and Illustrating 2D Seismic Data," 14(6), pp. 1571-1578.

Pitas, I. et al. (1989), "Texture Analysis and Segmentation of Seismic Images," Int'l. Conf. on Acoustics, Speech and Signal Processing, pp. 1437-1440.

Simaan, M.A. (1991), "Knowledge-Based Computer System for Segmentation of Seismic Sections Based on Texture," *SEG Expanded Abstracts* (10), pp. 289-292A.

Valet, L. et al. (2001), "Seismic Image Segmentation by Fuzzy Fusion of Attributes," *IEEE Transactions on Instrumentation and Measurement* 50(4), pp. 1014-1018.

* cited by examiner

Self Overlap    Local Inconsistency    Global Inconsistency

Absolute Concurrence Table

Relative Concurrence Table

METHOD FOR CREATING A HIERARCHICALLY LAYERED EARTH MODEL

This application is the National Stage of International Application No. PCT/US2010/051902, that published as WO 2011/056347, filed 8 Oct. 2010, which claims the benefit of U.S. Provisional Application No. 61/258,405, filed Nov. 5, 2009, each of which is incorporated herein by reference, in its entirety, for all purposes.

FIELD OF THE INVENTION

This invention relates generally to the field of geophysical prospecting, and more particularly to the analysis of seismic data. More particularly, the invention relates to partitioning a seismic data volume progressively into a sequence of regions for data analysis, interpretation, or visualization.

BACKGROUND OF THE INVENTION

Seismic segmentation is the partitioning of a seismic data volume into a set of non-overlapping regions whose union is the entire volume. Hierarchical means that regions of an initial partitioning are combined progressively until the entire volume belongs to one and the same region. This invention describes a hierarchical-segmentation method for the computer-assisted interpretation of seismic volumes with applications ranging from the generation of geologically realistic geobodies to the large-scale definition of sequences. The hierarchical segmentation allows the human or computer interpreter to select segments and to zoom in and out of segments for visualization, interpretation, and further analysis of the segments or their hierarchically lower components.

U.S. Pat. No. 6,438,493 ("Method for Seismic Facies Interpretation Using Textural Analysis and Neural Networks") to West and May discloses a method for segmentation based on seismic texture classification. For a prescribed set of seismic facies in a seismic data volume, textural attributes are calculated and used to train a probabilistic neural network. This neural network is then used to classify each voxel of the data, which in practice segments the data into the different classes. Further, U.S. Pat. No. 6,560,540 ("Method for Mapping Seismic Attributes Using Neural Networks") to West and May discloses a method for classification of seismic data during the seismic facies mapping process.

U.S. Pat. No. 6,278,949 ("Method for Multi-Attribute Identification of Structure and Stratigraphy in a Volume of Seismic Data") to Alam discloses a method for the visual exploration of a seismic volume without horizon picking or editing, but that still displays all horizons with their stratigraphic features and lithologic variations. Seismic data are processed to generate multiple attributes at each event location with a specified phase of the seismic trace. Subsets of multiple attributes are then interactively selected, thresholded, and combined with a mathematical operator into a new volume displayed on a computer workstation. Manipulation of attribute volumes and operators allows the user to recognize visually bodies of potential hydrocarbon reservoirs.

U.S. Pat. No. 7,145,570 ("Magnified Texture-Mapped Pixel Performance in a Single-Pixel Pipeline") to Emberling and Lavelle discloses a system and method for improving magnified texture-mapped pixel performance in a single-pixel pipeline.

U.S. Pat. No. 6,631,202 ("Method for Aligning a Lattice of Points in Response to Features in a Digital Image") to Hale discloses a method for generating a lattice of points that respect features such as surfaces or faults in a seismic data volume. Hale and Emanuel further disclose methods ("Atomic Meshing of Seismic Images," *SEG Expanded Abstracts* 21, 2126-2129 (2002); and "Seismic interpretation using global image segmentation", *SEG Expanded Abstracts* 22, 2410-2413 (2003)) to segment a data volume by creation of a space-filling polyhedral mesh based on this lattice.

U.S. Pat. No. 7,024,021 to Dunn and Czernuszenko discloses a method for performing a stratigraphically-based seed detection in a 3-D seismic data volume. The method honors the layered nature of the subsurface so that the resulting geobodies are stratigraphically reasonable. The method can either extract all geobodies that satisfy specified criteria or determine the size and shape of a specific geobody in a seismic data volume.

U.S. Pat. No. 7,248,539 ("Extrema Classification") to Borgos et al. discloses a method for the automated extraction of surface primitives from seismic data. The steps include construction of seismic surfaces through an extrema representation of a 3D seismic data, computation of waveform attributes near the extrema, and classification based on these attributes to extract surface pieces. Pieces are then combined into horizon interpretations, used for the definition of surfaces or the estimation of fault displacements.

U.S. Patent Application Publication 2007/0036434 ("Topology-Based Method of Partition, Analysis, and Simplification of Dynamical Images and Its Applications") by Saveliey discloses a method for the topological analysis and decomposition of dynamical images through computation of homology groups to be used, for example, for image enhancement or pattern recognition. A dynamical image is an array of black-and-white images (or frames) of arbitrary dimension that are constructed from gray scale and color images, or video sequences. Each frame is partitioned into a collection of components that are linked to the ones in adjacent frames to record how they merge and split.

U.S. Patent Application Publication 2008/0037843 ("Image Segmentation for DRR Generation and Image Registration") by Fu et al. discloses a method for enhancing the multi-dimensional registration with digitally reconstructed radiographs derived from segmented x-ray data.

U.S. Patent Application Publication 2008/0140319 by Monsen et al. discloses a method of processing stratigraphic data, such as horizon surfaces, within a geological volume. The method assigns each stratigraphic features relative geological ages by construction of a graph structure which is used for interpretation.

U.S. Patent Application Publication 2008/0170756 by Beucher et al. discloses a method for the determination of coherent events in a seismic image which employs a hierarchical segmentation based on the watershed algorithm to track coherent surfaces.

U.S. Patent Application Publication 2008/0243749 ("System and Method for Multiple Volume Segmentation") by Petter et al. discloses a method for performing oilfield operations that co-renders a visually-melded scene from two different seismic datasets. The visually-melded scene comprises a visualized geobody that is used to adjust an oilfield operation.

PCT Patent Application Publication WO 2009/142872 ("Seismic Horizon Skeletonization") by Imhof et al. discloses a method that extracts all surfaces from a seismic volume simultaneously. The resulting seismic skeleton is stratigraphically and topologically consistent.

PCT Patent Application PCT/US2010/033555 ("Method for Seismic Interpretation Using Seismic Texture Attributes")

by Imhof discloses a method to classify seismic data based on the texture of neighborhoods surrounding the analysis points.

Pitas and Kotropoulos ("Texture Analysis and Segmentation of Seismic Images", *International Conference on Acoustics, Speech, and Signal Processing*, 1437-1440 (1989)) propose a method for the texture analysis and segmentation of geophysical data based on the detection of seismic horizons and the calculation of their attributes (e.g. length, average reflection strength, signature). These attributes represent the texture of the seismic image. The surfaces are clustered into classes according to these attributes. Each cluster represents a distinct texture characteristic of the seismic image. After this initial clustering, the points of each surface are used as seeds for segmentation where all pixels in the seismic image are clustered in those classes in accordance to their geometric proximity to the classified surfaces.

Simaan (see, e.g., "Knowledge-Based Computer System for Segmentation of Seismic Sections Based on Texture", *SEG Expanded Abstracts* 10, 289-292 (1991)) disclosed a method for the segmentation of two-dimensional seismic sections based on the seismic texture and heuristic geologic rules.

Fernandez et al. ("Texture Segmentation of a 3D Seismic Section with Wavelet Transform and Gabor Filters," 15$^{th}$ *International Conference on Pattern Recognition*, 354-357 (2000)) describe a supervised segmentation (i.e., classification) of a 3D seismic section that is carried out using wavelet transforms. Attributes are computed on the wavelet expansion and on the wavelet-filtered signal, and used by a classifier to recognize and subsequently segment the seismic section. The filters are designed by optimizing the classification of geologically well understood zones. As a result of the segmentation, zones of different internal stratification are identified in the seismic section by comparison with the reference patterns extracted from the representative areas.

Valet et al. ("Seismic Image Segmentation by Fuzzy Fusion of Attributes," *IEEE Transactions On Instrumentation And Measurement* 50, 1014-1018 (2001)) present a method for seismic segmentation based on the fusion of different attributes by using a set of rules expressed by fuzzy theory. The attributes are based on the eigen-values of structure tensor and measure total energy and dip-steered discontinuity. The final result is a segmentation into high-amplitude continuous layers, chaotic regions, and background.

Monsen and Ødegård disclose a method for the segmentation of seismic data in "Segmentation of Seismic Data with Complex Stratigraphy Using Watershedding—Preliminary Results" in the proceedings of *IEEE 10$^{th}$ Digital Signal Processing Workshop, and the 2nd Signal Processing Education Workshop*, (2002). The seismic data are treated as a topographic map. All the minima in the relief are slowly flooded. When the water level from different floods merges, dams are built to stop the flood from spilling into different domains. The flooding is continued until all of the relief is covered. The ultimate segmentation is then given by the dams that have been built. The problem with the watershed algorithm is its inherent tendency to over-segment due to small, local minima. Progressive removal of small minima yields a hierarchical multiresolution segmentation of nested segments. Further, Monsen et al. ("Multi-scale volume model building," *SEG Expanded Abstracts* 24, 798-801 (2005)) disclose a method for automated hierarchical model building with the promise of multi-scale model consistency. No further details are disclosed, however.

Faucon et al. ("Morphological Segmentation Applied to 3D Seismic Data," in *Mathematical Morphology: 40 Years On, Computational Imaging and Vision*, Volume 30, 475-484 (2005)) present the results obtained by carrying out hierarchal segmentation on 3D seismic data. First, they perform a marker-based segmentation of a seismic amplitude cube constrained by a previously picked surface. Second, they apply a hierarchical segmentation to the same data without a priori information about surfaces. Further, Faucon et al. ("Application of Surface Topological Segmentation to Seismic Imaging," in *Continuous Level of Detail on Graphics Hardware*, Lecture Notes in Computer Science, Volume 4245, 506-517 (2006)) present a method to segment and label horizontal structures in 3D seismic data that is based on morphological hierarchical segmentation. The initial extracted surfaces are post-processed using the topological segmentation method to separate multi-layered surfaces.

Lomask et al. ("Application of Image Segmentation to Tracking 3D Salt Boundaries," *Geophysics* 72, 47-56 (2007)) present a method to delineate salt from sediment using normalized cuts image segmentation that finds the boundaries between dissimilar regions of the data. The method calculates a weight connecting each pixel in the image to every other pixel within a local neighborhood. The weights are determined using a combination of instantaneous amplitude and instantaneous dip attributes. The weights for the entire date are used to segment the image via an eigensystem decomposition.

Kadlec et al., ("Confidence and Curvature-Guided Level Sets for Channel Segmentation," *SEG Expanded Abstracts* 27, 879-883 (2008)) present a method for segmenting channel features from 3D seismic volumes based on the local structure tensor.

Patel et al., ("The Seismic Analyzer: Interpreting and Illustrating 2D Seismic Data", *IEEE Transactions On Visualization And Computer Graphics* 14, 1571-1578 (2008)) disclose a toolbox for the interpretation and illustration of two-dimensional seismic slices. The method precalculates the horizon structures in the seismic data and annotates them by applying illustrative rendering algorithms such as deformed texturing and line and texture transfer functions.

What is needed is a method that partitions a volume of geological or geophysical data into a set of stratigraphically realistic layers or geobodies. Because stratigraphy is multi-cyclical, and thus hierarchical, a unique decomposition may not be desirable. Instead, a hierarchical multiresolution segmentation into nested layers or geobodies is more appropriate. The present invention fulfills at least this need.

SUMMARY OF THE INVENTION

In one embodiment, the invention is a method for analyzing a geophysical data volume obtained or derived from a geophysical survey of a subsurface region to determine physical structure of the subsurface region, comprising:

(a) dividing the data volume into a plurality N of initial segments, at least one segment being greater than one voxel in size;

(b) successively combining pairs of segments until the number of segments is reduced to a selected number M, where M<N; and (c) analyzing some or all of either the M segments, or segments from an intermediate stage of combination, to interpret subsurface physical structure.

BRIEF DESCRIPTION OF THE DRAWINGS

The present invention will be better understood by referring to the following detailed description and the attached drawings in which.

Figure 1:
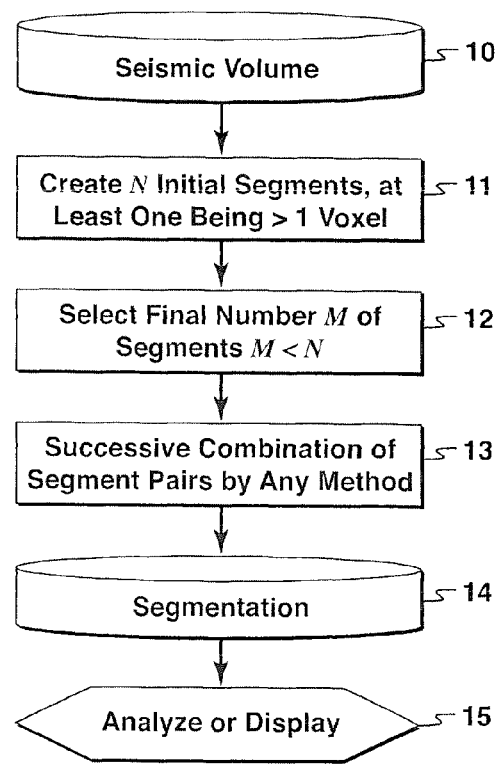
FIG. 1 is a flow chart showing basic steps in one embodiment of the invention.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

In order to search for hydrocarbon accumulations in the earth, geoscientists use methods of remote sensing to look below the earth's surface. In the routinely used seismic reflection method, man-made sound waves are generated near the surface. The sound propagates into the earth, and whenever the sound passes from one rock layer into another, a small portion of the sound reflects back to the surface where it is recorded. Typically, hundreds to thousands of recording instruments are employed. Sound waves are sequentially excited at many different locations. From all these recordings, a two- or three-dimensional image of the subsurface is obtained after significant data processing.

While individual layers are relatively easy to define in seismic data, the automatic definition of broader packages is challenging. In one of its aspects, this invention is a method for iteratively combining layers into bigger units. The different embodiments of the present invention create a hierarchy of layers or packages that resemble stratigraphic units. Within this hierarchy of layers, small regions may correspond to layers, intermediate ones might be sequences, while large ones could form sequence sets. Secondarily, these methods can also be used to combine many smaller geobodies into progressively fewer but larger ones. Applications of this computer-assisted packaging of seismic volumes range from the generation of geologically realistic geobodies to the large-scale definition of sequences and the construction of layered earth models for the exploration, delineation, and production of hydrocarbons. The hierarchy allows the human or computer interpreter to select layers or regions and to zoom in and out of them for visualization, interpretation, and further analysis.

In the disclosure herein, data are commonly referred to as being seismic amplitude volumes. This presentation should not be construed to mean that data are limited only to seismic amplitude volumes. Other potential data include seismic attribute volumes; other geophysical data, for example seismic velocities, densities, or electrical resistivities; petrophysical data, for example porosity the sand/shale ratio; geological data, for example lithology or the environment of deposition; geologic models and simulations; reservoir simulations, for example pressures and fluid saturations; or engineering and production data, for example pressures or water cut. The term geophysical data will be understood to include all such data.

Segmentation refers to the process of partitioning a data volume into multiple objects, regions or sets of voxels. For the presentation of the invention, the term segment connotes at least layer and geobody. The term initial segment is used for the primitives, i.e. the initial layers or geobodies that are to be merged into larger ones. Typically, initial segments have a spatial extent larger than one point or voxel. Typically, an initial segment consists of multiple voxels that are spatially related or connected.

Typically, the initial segments are created by clustering, classification, or segmentation. Other methods of generating initial segments include thresholding, binning, skeletonization, or automatic feature tracking. For thresholding, either the user or an algorithm specifies a threshold value. All points with lower values are assigned to a background segment. The remaining voxels are converted to contiguous segments, for example by application of a connected component labeling algorithm. The case where points with values exceeding the threshold are assigned to the background follows by analogy. These cases are further generalized by binning the data into user or algorithm specified bins, which creates initial segments that may be further refined with a connected component labeling algorithm. Initial segments can be constructed by clustering of points or voxels from one or multiple datasets, or even recursively by clustering of other segments. Initial segments can also be created by automated or assisted tracking using horizon trackers, horizon pickers, fault trackers, channel trackers, or seed picking. One particular form of automated horizon picking is seismic skeletonization, which automatically picks many surfaces simultaneously. Horizons can be converted to segments by dilation (or thickening) of the surfaces in one or multiple directions until another is encountered. Another method of converting horizons to initial segments is to assign the samples between horizons according to polarity or wavelet shape. Persons trained in the technical field may know of other ways to create initial segments.

The details of the initial-segment creation are irrelevant for the present inventive method in any of its various embodiments. The inventive method converts an initial segmentation, however performed, into a sequence of segmentations with progressively fewer but larger segments. Another way to describe the method is that segments are progressively combined. The different embodiments of the inventive method revolve around the order in which the segments are combined.

FIG. 1 presents basic steps in some embodiments of the present inventive method. At step 11, an initial segmentation is created for a given seismic dataset 10. Details of this step are irrelevant for the present inventive method as long as the volume is decomposed into a plurality of, preferably many, mutually exclusive regions or initial segments that are preferably nontrivial, i.e. span more than just one voxel, which experienced data interpreters will know how to provide, thus giving a guided and accelerated start to the process of combining segments. At step 12, which may be performed before or after step 11, the user or a computer algorithm selects the ultimate number of desired segments. Because for practical purposes the successive combination of segment pairs (step 13) will typically be performed on a computer, the computer needs to be instructed when to stop the process.

Since the number selected can be one, this step does not limit the present inventive method. At step 13, pairs of segments are combined until the desired number of segments is reached. This is performed by any of several techniques, preferably one or more of those disclosed below. The resulting segmentation 14 is stored for analysis or visualization (15).

Methods for the analysis of segments are disclosed separately from the different embodiments because the methods for analysis are independent of the specifics of the hierarchical segmentation method.

A preferred embodiment of the basic FIG. 1 method involves setting the ultimate number of segments to be one, i.e. the progressive combination of segments is continued until one segment remains, spanning the entire volume. All the stages from the initial segmentation down to one segment are recorded and are thus retrievable states. During analysis or visualization, the user or the algorithm may choose any state, for example in an interactive manner.

The different states can be recorded either by, among other methods, re-labeling the individual voxels after each stage, by re-labeling the entries of a lookup table relating the initial segment labels to the segment labels at each stage, or preferably, by use of an equivalence table that only records which segments are merged at each stage. A lookup-table for each stage can be reconstructed by evaluating all equivalences up to this point. The recreated lookup table may then be used to re-label the voxels for storage, analysis, or visualization; to construct a color map for visualization; or to control opacity during visualization.

Creation of an Initial Segmentation (Step 11)

The initial segments can be created in many different ways. Methods include thresholding, binning, or clustering the data; automatic feature tracking; or segmentation. For thresholding, either the user or an algorithm specifies a threshold value. All points with lower values are assigned to a background segment. The remaining voxels are converted to contiguous segments, for example by application of a connected component labeling algorithm. The case in which points with values exceeding the threshold are assigned to the background follows by analogy. These cases may be further generalized by binning the data into user or algorithm specified bins which creates initial segments that can be further refined with a connected component labeling algorithm. Primitives can be constructed by clustering of voxels from one or multiple datasets, or even recursively by clustering of other segments.

Initial segments can be created by automated or assisted tracking using horizon trackers, horizon pickers, fault trackers, channel trackers, or seed picking. Horizons can be converted to segments by dilation (or thickening) of surfaces until another is encountered. The dilation can be performed in one direction only or simultaneously in multiple directions. Another method of converting horizons to segments is to assign the samples between horizons according to polarity or wavelet shape.

Initial segments can also be created by preliminary segmentation by clustering or classification. All voxels in one segment are similar with respect to some characteristic or computed property while adjacent segments are significantly different with respect to the same characteristics. Clustering-based segmentation is an iterative technique that is used to partition a dataset into a specified number of clusters or objects. Histogram-based methods compute a histogram for some characteristic or property for the entire dataset and use the peaks and valleys in the histogram to locate the clusters or objects. A further refinement of this technique is to recursively apply the histogram-seeking method to clusters in the data in order to divide them into increasingly smaller clusters until no more clusters are formed. Methods based on edge detection exploit the fact that region or object boundaries are often closely related to edges or relatively sharp property transitions. For seismic data, discontinuity, similarity, or differentiators serve as edge detectors. The edges identified by edge detection are often disconnected. To segment an object from a data volume, however, one needs closed region boundaries. Edge gaps are bridged if the distance between the two edges is within some predetermined threshold. Region growing methods take a set of seed points as input along with the data. The seeds mark each of the objects to be segmented. The regions are iteratively grown by comparing all unallocated neighboring voxels to the regions. This process continues until either all voxels are allocated to a region, or the remaining voxels exceed a threshold difference when compared to their neighbors. Level set methods or curve propagators evolve a curve or surface towards the lowest potential of a prescribed cost function, for example smoothness. The curves or surfaces either represent the desired objects, for example faults or channel axes; or they correspond to the boundaries of the desired objects, for example salt domes or channels. In the latter case, the curve appears to shrink wrap the object. Graphs can effectively be used for segmentation. Usually a voxel, a group of voxels, or primordial objects are vertices and edges define the (dis)similarity among the neighborhood voxels or objects. Some popular algorithms of this category are random walker, minimum mean cut, minimum spanning tree-based algorithm, or normalized cut. The watershed transformation considers the data or their gradient magnitude as a (multidimensional) topographic surface. Voxels having the highest magnitudes correspond to watershed lines, which represent the segment boundaries. Water placed on any voxel enclosed by a common watershed line flows downhill to a common local minimum. Voxels draining to a common minimum form a catch basin, which represents a segment or object. Model-based segmentation methods assume that the objects of interest have a repetitive or predicable form of geometry. This geometric form is characterized with statistics that are used to control the segment growth. Scale-space segmentation or multi-scale segmentation is a general framework based on the computation of object descriptors at multiple scales of smoothing. Neural Network segmentation relies on processing small areas of a dataset using a neural network or a set of neural networks. After such processing, the decision-making mechanism marks the areas of the dataset accordingly to the category recognized by the neural network. Last, in assisted or semi-automatic segmentation, the user outlines the region of interest, for example by manual digitization with computer mouse, and algorithms are applied so that the path that best fits the edge of the object is shown. The listed methods here are just some examples for the generation of an initial segmentation. Many other methods can also be used.

Successive Combination of Segment Pairs (Step 13)

For the purpose of the present inventive method, however, details of the initial segmentation are irrelevant. The initial segmentation method may create many thousands of initial segments; however preferably some of the segments are larger than a single voxel. This is for reasons of computational efficiency and the geologic realism of the resulting layers or segments. Some of the embodiments of the invention require a list of neighbors around each segment. Even more restrictive, some embodiments require definition of linear sequence in which segments are combined. If all or most segments consist of single voxels, differentiation of voxels and/or neighborhoods is insufficient to define neighborhoods or to form such a sequence. The present disclosure provides a method that combines these initial segments into sets of stratigraphically or geophysically realistic layers or geobodies. Because stratigraphy is multi-cyclical, and thus hierarchical, a unique decomposition may not be desirable. Instead, a hierarchical multiresolution segmentation into nested layers or geobodies is more appropriate. The present invention fulfills at least this need.

Size Guided Segment Combination

The basic idea of a size-guided option for performing the segment combination of step 13 is to start with segments and to progressively merge small juxtaposed segments into larger ones. Preferably, segments for this embodiment correspond to layers or layer pieces, and thus, this embodiment combines thin layers into progressively thicker ones, which allows going from parasequence (sets) to sequences and sequence sets of various orders.

Figure 2:
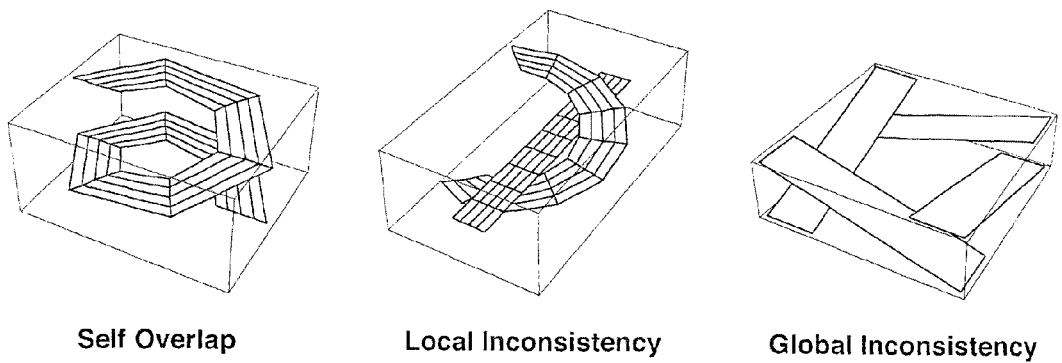
FIG. 2 shows examples of topological inconsistencies between one or multiple layers or segments.

Although not a requirement, preferably the initial segments or initial layer pieces are topologically consistent. Strict topological consistency implies conditions with regard to the geometric arrangement of set of layers:

1. A layer may not overlap itself. This condition may be called the condition of No Self Overlaps. It is illustrated in FIG. 2.
2. Two layers cannot reverse their geometric relationship. One layer may not be above another at one location, and below it at another location. This condition may be called the condition of Local Consistency. It is illustrated in FIG. 2.
3. Sets of layers must preserve transitivity of the above/below relations. If layer one is above layer two, and layer two is above layer three, then layer three must be below layer one. This condition may be called the condition of Global Consistency. It is illustrated in FIG. 2.

It should be noted that the no-self-overlaps condition is actually a special case of the local consistency condition, and that the local consistency condition is a special case of the global consistency condition. Alternatively, the no self overlaps condition may be defined such that it applies to one layer piece or segment, the local consistency condition may be defined such that it applies only when two different layer pieces or segments are involved, and the global consistency condition may be defined such that it applies only when at least three different layer pieces or segments are involved, in which case the three conditions are mutually exclusive.

For a given set of segments, the collection of above/below relationships define their topology. A set of segments that satisfies at least one of the three conditions, preferably all three, are termed topologically consistent. Topological consistency of the thin layers is not a requirement for this embodiment of the inventive method of merging thin layers into larger units. Preferably, though, the initial thin layers are topologically consistent which results in a stratigraphically more realistic segmentation or large scale layering.

Using this segment combination technique, step 13 involves a staged combination of segments. At each stage, the smallest segment is sought. For this segment, its smallest neighbor is determined and these two segments are combined by either assigning them the same label, by updating a lookup table, or by recording their merge in an equivalence table, or by some equivalent bookkeeping technique for recording the combination. Preferably, the size and neighbors for each segment are determined only once and recorded in tables instead of repeating this for every stage. In this way, the size and neighborhood tables are created initially, and then are updated after each stage of the segmentation.

The following description of neighborhoods applies not only to embodiments using size-guided segment combination, but rather to the entire disclosure. For a given segment, its neighborhood specifies the candidate segments for combination. The neighborhood may be defined once at the start of the hierarchical combination of segments or be updated periodically or at every stage to reflect that surrounding segments have been combined themselves. In some embodiments, the neighborhood for a given segment is a list of directly touching segments, i.e., its neighbors. In some embodiments, neighborhoods are restricted to only certain directions, for example only laterally or vertically. In some embodiments, the neighborhood for a given segment may even contain segments that do not directly border the given segment, but simply list merge candidates, for example to specify a desired order or sequence in which segments are combined. Thus, the terms neighbor and neighborhood are not defined narrowly in the present disclosure.

One variation of the size-guided embodiment is to limit the search for the smallest neighbor to only a selected part of the neighborhood, for example only segments that are either lateral or vertical neighbors. Moreover, these two variations can be cascaded such that segments are first combined only in the lateral direction, which creates layers from layer pieces. These layer segments are then combined vertically in a second phase to create thicker layers or units that may correspond to sequences and sequence sets.

Figure 3:
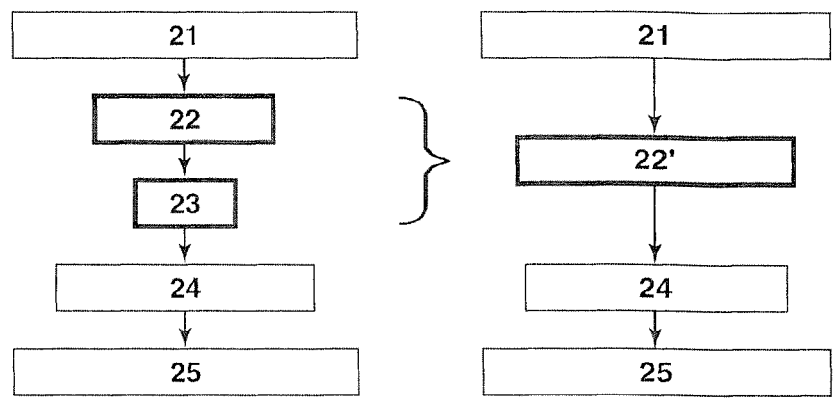
FIG. 3 shows an example of one possible type of size-guided combination of segment pairs.

One last variation of the size-guided embodiment is to limit each segment to have only two neighbors, for example one above and one below. In this case, the neighborhood table degenerates to a sequence or order between the segments. Progressive combinations of segments are limited to sequentially adjacent segments. This sequence or order may be constructed from the depths or stratigraphic ages of the segments. For the case of topologically consistent segments, the sequence can be obtained from the analysis of the above/below relationships between the segments. The individual above/below relationships define a partial order that, for topologically consistent segments, allow creation of a total order consistent with the partial order. At each stage of this variation, the smallest segment is merged with the smaller of its two consecutive neighbors. This is illustrated in FIG. 3, where the smallest segment 23 is merged with its smaller neighbor 22 to form combined segment 22'. This approach prevents one segment from growing much faster than the others. It balances the size of the merged segments and creates a pleasing segmentation with layers of roughly similar thickness.

Extrema-based Segment Combination

The basis for the extrema-based option for performing the segment combination of step 13 is that segment or layer boundaries can be recognized as extremes on graphs of a segment property such as area or volume versus sequential segment number. Most extremes disappear when blurring the graph, and only the dominant ones remain as demonstrated in FIG. 4, which allows segmentation of the sequence into increasingly thicker units.

First, the initial segments are sequentially labeled, for example top down, by depth, or by their stratigraphic age. Next, a property such as area or volume is computed for each segment. One then locates the local minima in this property sequence and combines the segments between the local minima. The segments corresponding to the local minima are merged with one of its sequentially adjacent segments, for example upwards, downwards, of with the smaller one.

Now the properties are lightly blurred or smoothed, for example by application of a low-pass filter or short running-average filter. Most extrema will slightly move but can easily be related or tracked to one of the original extrema. Some extrema, however, vanish and the segments above and below the vanished extrema are combined. This procedure is repeated with another pass of blurring, extrema tracking, detection of vanishing extrema, and combination of the segments bracketing the vanished extrema; and so on until no extrema remain and thus all segments are combined into one.

Figure 4:
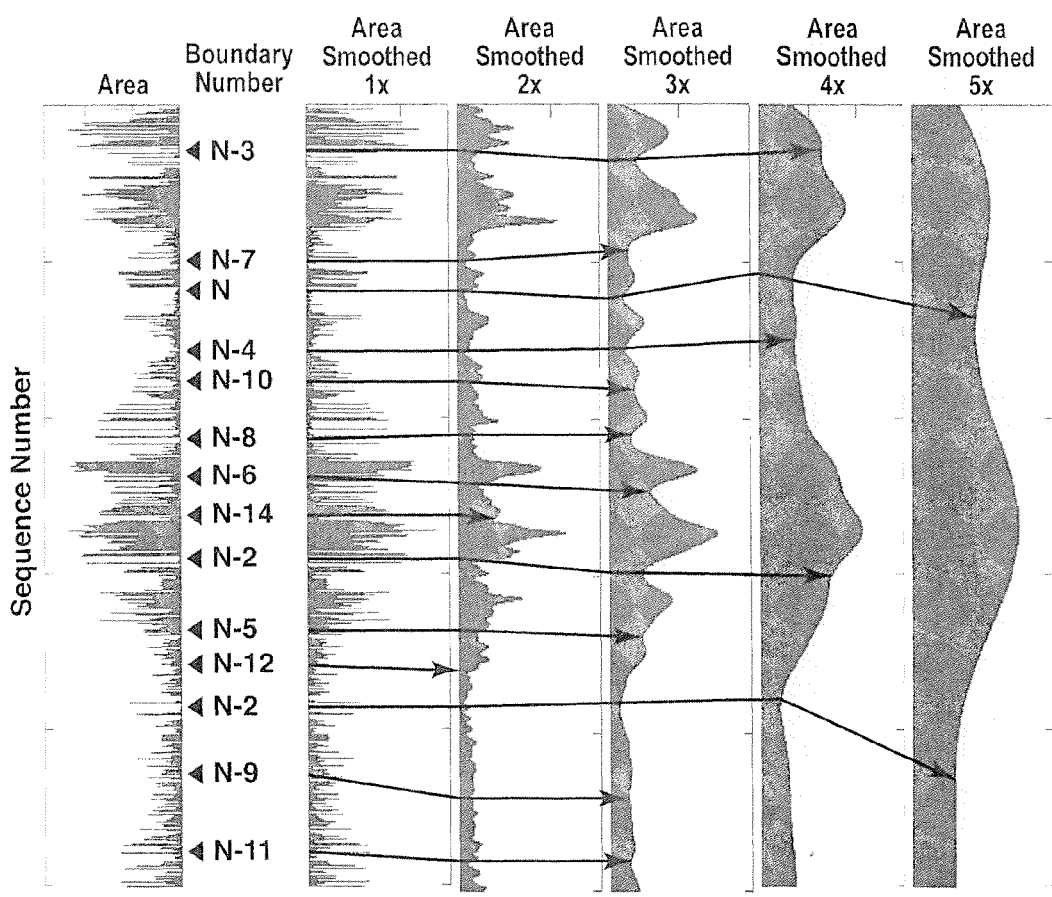
FIG. 4 is a schematic diagram illustrating extrema-based combination of segment pairs in the present inventive method.

Summarizing FIG. 4, the graph of sequential segment number versus segment area exhibits many minima that separate layers. Tracking the minima during progressive smoothing of the graph determines the relevance of these layer boundaries. Minor minima correspond to minor boundaries separating segments that are combined early. Major minima can be tracked across many iterations of smoothing and correspond to major boundaries separating segments that are combined late. The "boundary number" indicates the order in which the extrema vanish and thus the order in which the directly adjacent segments are combined.

As an alternative to the iterative blurring of the graph with the same slight filter, the initial graph can be smoothed with progressively more aggressive filters. As an alternative to the initial combination of segments between local extrema, a virtual extrema can be inserted between the initial segments and the first combination step can be skipped. The virtual extrema are rapidly eliminated by the progressive filtering.

Thus, the first step in the extrema-based option for doing step 13 is putting the initial segments into a list or sequence sorted, for example top-down, by their depth, or geologic age. Any sequence will suffice, with the understanding that eventually segments adjacent in this sequence will be merged, and thus the order of the initial segments in this sequence affects the final result. Preferably, segments that are spatially close will remain close in this sequence. A preferred sequence order is based on their geologic age, their order of deposition or creation, or an approximation thereof. Ideally, the segments are topologically consistent allowing generation of at least one such sequence consistent with the spatial relationships. Next, a property or attribute is computed for each segment, for example area, number of voxels, or volume. Alternatively, segment properties can be computed using collocated values from at least one secondary dataset such as a seismic attribute volume, other geophysical or geologic data, or a geologic or engineering model. These values are sequentially placed in a property table or list. Optionally, this list is modified, for example by application of a differentiator (high-pass filter) and/or integrator (low-pass filter).

Extrema in this property table are used to define a first set of segments where the initial segments between two adjacent extrema are combined. These extrema can be either minima, maxima, or minima and maxima. Minima are used for the description of this technique, but the method is analogous for other extrema. In the next step, the property list is slightly blurred by application of a modest low-pass or running average filter. Most minima will move to a slightly different location but can easily be tied to one of the original ones. Difficulties or ambiguities when tying minima back to the original ones indicate that the filter was too severe, and that the blurring should be redone with a slighter filter. Some minima may vanish, however, and the segments that are directly adjacent to the corresponding initial minima are combined.

The step of blurring and combination of segments adjacent to vanishing minima is repeated until all minima have vanished. The steps of blurring, tracking, and combination do not need to be repeated in this order. Preferably, the blurring is performed progressively using slight to severe filters or recursively using the same slight filter, and the different version of the blurred property are stored for example in a matrix or table. Next, the minima are tracked through the matrix or table, and the stage at which a minima vanishes is recorded. Lastly, at each stage, the segments adjacent to a vanishing minima are combined, for example by updating a lookup table or recording in an equivalence table.

As an alternative to the progressive blurring, a wavelet decomposition of the initial property table may be used.

Attribute-guided Segment Combination

In the attribute-guided option for performing the segment combination of step 13, the segments are combined if they are similar with regard to some selected property or attribute. This attribute is preferably either based on the segments themselves, for example their geometries, or based on external data such as a secondary seismic volume. Traditionally, the most similar segments are combined first. For seismic data, combining the most similar segments first tends toward mega segments that rapidly grow and overtake the segmentation. In the later stages of the progressive segmentation, there tends to be one dominant segment with small embedded segments whose attributes or properties represent outliers in the distribution of attributes or properties.

A difference in this alternative approach is that small segments are combined first. At each stage, the currently smallest segment is combined with its most similar neighbor. The initial segments from step 11 are first examined to create tables of size and respective neighbors. The method also computes one or multiple attributes for the individual segments based on the segments themselves. Such attributes include size, location, volume, moments, orientations, etc. The method then proceeds with a staged combination of similar or nearby segments, where similarity is computed using some similarity measure such as an L1-norm difference, least-squares (L2-norm) difference, or a Mahalanobis difference. To balance the segment growth, the smallest segment at each stage is combined with its most similar neighbor, that combination is recorded, and the size, neighborhood, and attribute tables are updated. Depending on the nature of the attributes, the attributes for the combined segment can be obtained by, for example, retaining the attributes from one or the other combined segments, by retaining the maximal or minimal ones, or by addition or multiplication of these attributes. In some cases, for nonlinear attributes for example, the attributes for the combined segments may need to be computed anew.

A preferred version of attribute-guided segment combination uses a secondary dataset to compute the segment attributes, for example another seismic data volume such as seismic envelope amplitude. In this example, the attribute could be the maxima, average, or the variance of the envelope amplitude contained in the segment. Other examples include seismic attribute volumes; geophysical data, for example seismic velocities, densities, or electrical resistivities; petrophysical data, for example porosity the sand/shale ratio; geological data, for example lithology or the environment of deposition; geologic models and simulations; reservoir simulations, for example pressures and fluid saturations; or engineering and production data, for example pressures or water cut. The method then proceeds with a staged combination of segments similar with respect to the attribute, where similarity is computed using some user- or computer-specified similarity measure. To balance the segment growth, the smallest segment at each stage may be combined with its most similar neighbor, and the size, neighborhood, and attribute tables are updated. Depending on the nature of the attributes, the attributes for the combined segment can be obtained from the attributes of the respective segments, or may need to be computed anew from the secondary data at the locations of the combined segment.

Figure 5:
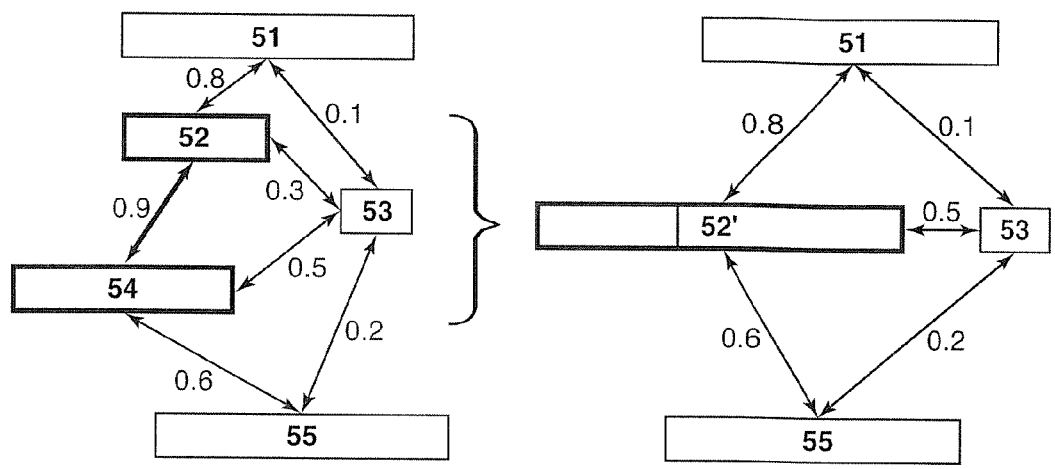
FIG. 5 is a schematic diagram illustrating attribute-guided combination of segment pairs in the present inventive method.

FIG. 5 presents an example of the attribute-guided merge without segment growth controlled by size as used for traditional segmentation. The most similar segments are combined and will slowly gobble up their neighbors. Large segments will themselves begin to combine until a few huge segments remain, inside which the most dissimilar initial segments linger as outliers. In FIG. 5, the arrows indicate neighboring segments and the numbers attached to the arrows indicate the similarity between individual segments. Segments 52 and 54 are most similar and thus, are merged into the new segment 52'.

Figure 6:
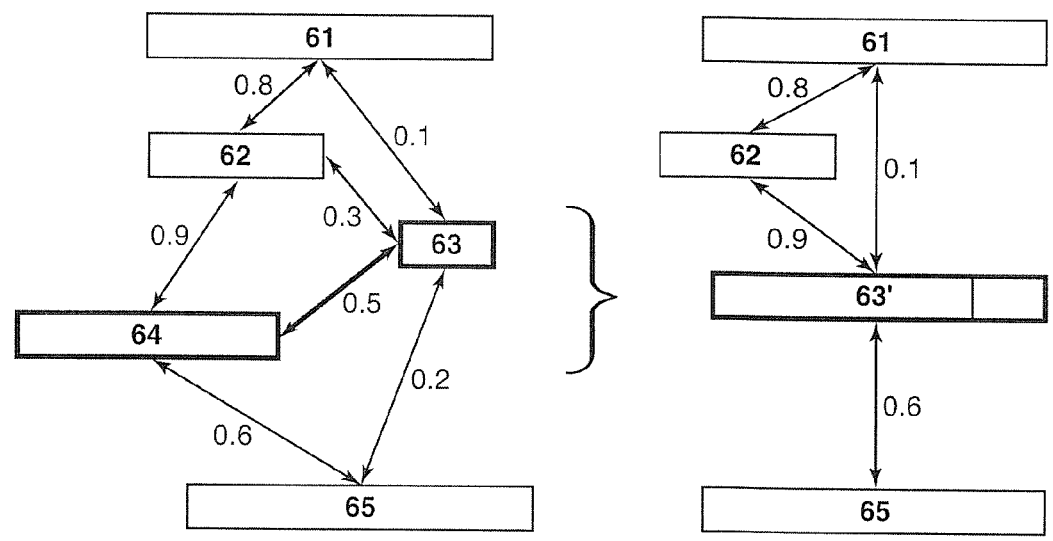
FIG. 6 presents an alternative to the example of FIG. 5.

An alternative to the example of FIG. 5 is presented in FIG. 6. The currently smallest segment 63 is combined with its attribute-wise most similar neighbor 64 to constitute the new segment 63', where the most similar neighbor is the one with the least attribute difference. This preferred alternative balances the segment growth ensuring that no segment captures most of the others during the early stages of the progressive combination of segments.

Enabler-inhibitor-based Segment Combination

The enabler-inhibitor option for performing the segment combination of step 13 introduces a distance function that encourages or inhibits the combination of any two segments. This distance between segments can either be computed from the segments, segment attributes, secondary data, or a combination thereof. One particular application of this embodiment is to imprint a bias against combination of certain pairs of segments. The distance function can be viewed as a generalization of the similarity measure used for attribute-guided combination. Preferably, the distance function (or similarity measure) is stored in a distance table or distance matrix (or similarity table or similarity matrix) that is progressively being updated to account for the sequential combination of segments.

One example is the use of seismic incoherency or discontinuity to discourage the merge of segments across faults or through zones of low data quality. In either case, there exists a barrier of high seismic incoherency that is used to amplify the segment distance.

Another example is the use of previously identified surfaces such as stratigraphic unconformities or faults as barriers and distance amplifiers. The surfaces are obtained either by manual interpretation or application of an automatic detection algorithm.

Concurrence-based Segment Combination

In the concurrence-based option for performing the segment combination of step 13, relationships such as concurrence between neighboring segments are exploited in the process of combining segments. Concurrence refers to the concept that elements of related segments border each other more often than elements of unrelated ones. A classifier based on seismic texture or seismic attributes can easily generate hundreds of different classes. Multiple classes may correspond to one geophysical, geological or stratigraphic feature.

Spatially, locations so classified tend to cluster together because they all correspond to the same or similar features. Moreover, many such features are not truly discrete but rather gradational such as an environment of deposition. Spatially, locations so classified tend to appear adjacent to each other. An example is the progression of depositional environments or elements from channel axis, to channel margin, and overbank deposits.

Thus, the basic idea of the concurrence-based embodiment is to perform an initial segmentation or classification into many more segments or classes than ultimately desired. Segments do not need to be contiguous. This segmentation or classification is then refined by concurrence segmentation where segments or classes that are juxtaposed more often, with longer common borders or over longer distances, are preferably combined.

Figure 7:
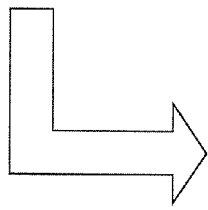
FIG. 7 shows an example of a concurrence-base combination of two segments where a concurrence table tracks the number of times a segment borders another one.
Figure 7:
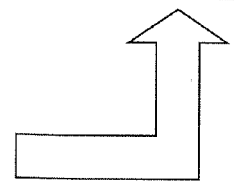

After an initial segmentation (step 11), for example by texture analysis and classification, a determination is made of how much each segment borders the others, for example by counting the number of neighboring voxel pairs. This information may be used to generate a concurrence table. The method continues then with a staged combination of the most proximal segments, i.e. those with the largest common border, or equivalently, the segments with the largest entry in the concurrence table. After recording the combination and updating the concurrence table, the procedure is repeated until only the prescribed number of segments remains, for example, only one. An example of one such iteration is shown in FIG. 7. There, the segments 21 and 22 with the highest concurrence count are merged into the new segment 21'. Concurrence-based segment combination tends to merge large segments because larger segments are more likely to have large common borders than smaller ones. A dominant background segment, for example, will grow rapidly by attracting large segments, while leaving the remaining small segments as isolated outliers.

Figure 8:
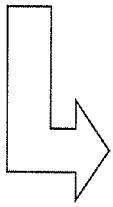
FIG. 8 shows an example of a concurrence-based combination of two segments where the concurrence table is weighted with the segment sizes.
Figure 8:
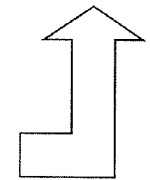

To obtain more balanced segmentations, the concurrence table may be weighted, for example by the combined size (number of voxels) of the respective segments. FIG. 8 shows an example of this where the segments 24 and 25 are merged instead of 21 and 22 as in FIG. 7 due to their larger ratio of common border to combined size. A dominant background segment is thus biased against by its large size, letting smaller segments merge first and thus this preferred variation creates more balanced segmentations. Other weighting options include but are not limited to the transformation of the concurrence matrix to a doubly stochastic (or bistochastic) matrix, multidimensional scaling (MDS), Sammon mapping, or Self-organized mapping (SOM).

Hybrid Ways of Combining Segment Pairs

Figure 9A:
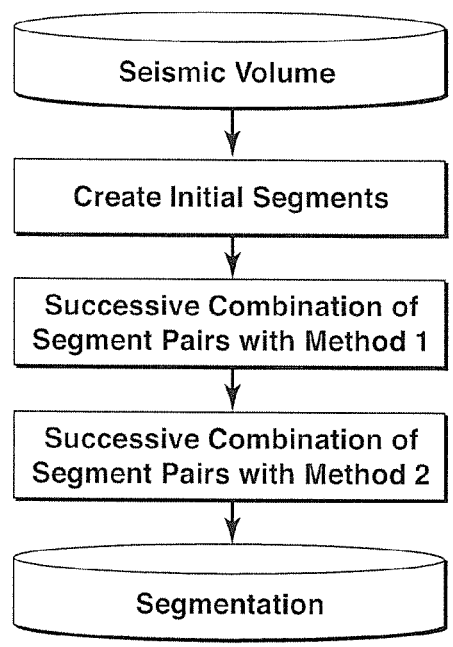
FIGS. 9A-B show examples of combination of segment pairs by a hybrid of two different combinatorial schemes, with the two schemes cascaded in FIG. 9A whereas in FIG. 9B one scheme is used to constrain the other.
Figure 9B:
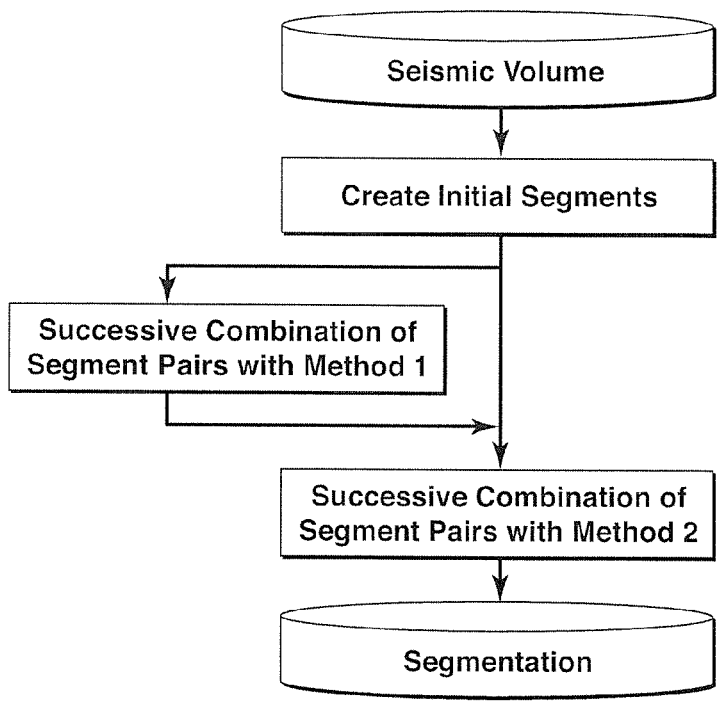

Hybrid options for performing the segment combination of step 13 relate to the idea that segmentation is applied in a cascaded or constrained manner, as depicted in FIGS. 9A-B. In cascaded mode (FIG. 9A), hierarchical segmentation is performed with one method up to some selected degree of segmentation, and then continued with another method. Small initial segments are merged with one embodiment to form intermediate segments that are then used as initial segments for the following merge to large segments with another embodiment. An example of the cascaded mode is the merge of initial segments to layers that are then combined into thick sequences.

In the constraint mode (FIG. 9B), the initial segments are merged using one of the options for performing segment combination to some intermediate stage of segmentation that serves as mask or constraint for an alternate segmentation. An alternate merge of the initial segments using another option for performing segment combination is then executed with the constraint of never merging segments belonging to different intermediate regions. Thus, the intermediate segments act as masks or constraints for the second hierarchical segmentation. An example of the constrained mode is the construction of sequence-bound geobodies. First, the initial segments are merged to define large-scale sequences. The merge is then restarted with the constraint that each resulting segment belongs to only one sequence. An alternative is to gather all the initial segments belonging to a particular sequence and to perform the merge of only these initial segments.

It is emphasized that the specific examples used above to help explain the various options for performing step 13 are not to be considered limiting on the general underlying concept stated for each option.

Segment Analysis (Step 15)

The present inventive method begins with a large number of segments (step 11) and then performs a staged segment combination (step 13). One application of this staged or hierarchical segmentation is to analyze the segments for their hydrocarbon potential, and then to create a ranked list of targets based on their hydrocarbon potential, or presence or quality of at least some elements of a hydrocarbon system, for example, source, maturation, migration, reservoir, seal, or trap.

Moreover, performance of this analysis at different stages of the hierarchical segmentation allows or at least aids the determination of the necessary or optimal number of segments, and thus, selection of an appropriate degree of segmentation. Since all the states of the segmentation from the initial segmentation to the final number of segments, possibly one, are recorded for example in the lookup or equivalence tables, some or all states can be reconstructed for analysis to determine characteristic degrees of segmentation.

Analysis and high-grading of entire segments is discussed in another patent application PCT Patent Application Publication WO 2009/142872, published on Nov. 26, 2009, entitled "Seismic Horizon Skeletonization," which discussion is summarized and extended next.

Analysis of the segments includes defining or selecting one or more measures that will be used to rank or high-grade the segments. The measure may be any combination of the segment geometries, properties of collocated secondary data, and relations between the segments. Geometric measures for segments refer to location, time or depth, size, length, area, cross section, volume, orientation, or shape. These measures also may include an inertia tensor; raw, central, scale- and rotation-invariant moments; or covariance. Other measures are based on the segment boundaries and include local or average curvatures, ratios between surface area and volume, or decomposition into spherical harmonics.

Collocated property measures are built by querying a dataset at the locations occupied by the segment. For example, one can extract the values from a collocated seismic or attribute dataset such as amplitude, seismic texture classification, or a collocated geologic model such as porosity or environment of deposition, and compute a statistical measure for these values. Statistical measures include average, median, mode, extrema, or variance; or raw, central, scale- and rotation-invariant property-weighted moments. If two collocated properties are extracted, then a measure can be computed by correlation of the collocated values, for example porosity and hydraulic permeability extracted from collocated geologic models.

Another family of analysis and measurements examines relations between segments. Measures include the distance or similarity to neighboring segments; the total number of neighboring segments, or the number of neighboring segments above or below a given segment.

One specific alternative for the analysis of the segments is the calculation and use of direct hydrocarbon indicators ("DHIs") to high-grade a previously generated set of segments. An example of such a DHI is amplitude fit to structure. In a hydrocarbon reservoir, the effect of gravity on the density differences between fluid types generates a fluid contact that is generally flat. Because the strength of a reflection from the top of a hydrocarbon reservoir depends on the fluid in that reservoir, reflection strength changes when crossing a fluid contact. Correlating the voxel depths within a segment with seismic attributes such as collocated amplitude strength facilitates rapid screening of all segments in a volume for evidence of fluid contacts, and thus, the presence of hydrocarbons.

Other examples of seismic DHI-based measures for the analysis of segments include amplitude anomalies, amplitude versus offset (AVO) effects, phase changes or polarity reversals, and fluid contacts or common termination levels. Other geophysical hydrocarbon evidence includes seismic velocity sags, and frequency attenuation; also, electrical resistivity. Amplitude anomaly refers to amplitude strength relative to the surrounding background amplitudes as well as their consistency and persistence in one amplitude volume, for example, the full stack. A bright amplitude anomaly has amplitude magnitudes larger than the background, while a dim anomaly has amplitude magnitudes smaller than the background. Comparison of seismic amplitudes at the segment location against an estimated background trend allows high-grading based on the anomalous amplitude strength DHI measure. For large segments, presence of an amplitude anomaly surrounded by background amplitudes express themselves with bi- or multi-modal histograms that can be detected by performance of a multi-modal histogram decomposition.

Comparing collocated amplitudes between different volumes, for example near-, mid-, and far-offset stacks allows assignment of an AVO class. An AVO Class 1 has a clearly discernable positive reflection amplitude on the near-stack data with decreasing amplitude magnitudes on the mid- and far stack data, respectively. An AVO Class 2 has nearly vanishing amplitude on the near-stack data, and either a decreasing positive amplitude with offset or progressively increasing negative amplitude values on the mid- and far-stack data. An AVO class 3 exhibits strong negative amplitudes on the near-stack data growing progressively more negative with increasing offset. An AVO Class 4 exhibits very strong, nearly constant negative amplitudes at all offsets. Preferably, amplitude persistence or consistency within a segment is used as a secondary measure within each of the AVO classes. Comparison of partial offset- or angle-stacks at the location of the segments allows classification by AVO behavior, and thus, high-grading based on the AVO DHI measure. An alternative to partial stacks is the estimation of the AVO parameters A (intercept) and B (gradient) from prestack (offset) gathers at the locations of the segments, and use of these parameters for AVO classification or computation of a measure such as A*B or A+B.

Evidence of fluid contact is yet another hydrocarbon indicator. A fluid contact implies a fluid change for example from hydrocarbon gas to water. A fluid contact can generate a relatively flat reflection response embedded in a segment. Cross-plotting or cross-correlation of seismic attributes versus depth within a segment allows identification or highlighting of fluid contacts, for example from a depth with extremal attributes or extremal attribute variance. Sometimes, the boundary between reservoir seal and water-filled reservoir is a seismic surface with positive polarity, while the boundary between seal and gas-filled reservoir is a surface with negative polarity. In such situations, the seal-reservoir boundary corresponds to a surface exhibiting a polarity change from shallow to deep across the fluid contact. Comparison of the wavelet polarity or estimation of the instantaneous wavelet phase within a segment allows identification of segments exhibiting a polarity-reversal or phase-change DHI.

An abrupt down dip termination of many nearby segments or a locally persistent abrupt change of amplitudes within the segments are yet more examples of direct hydrocarbon indicators that can be quantified from segments. The termination depths of adjacent segments are compared or correlated to allow identification of a set of segments exhibiting an abrupt down-dip termination DHI measure.

Using data other than seismic amplitudes enables other measures of direct hydrocarbon indicators. Hydrocarbon gas tends to increase the attenuation of seismic energy, and thus, to lower the frequency content of the seismic signal when compared to the surrounding background. Frequency shifts can be measured and quantified from instantaneous frequency volumes or by comparison of spectrally decomposed volumes. Observation of consistent frequency shifts at the location of the segments allows high-grading based on the frequency-shift DHI measure.

Hydrocarbon gas also leads to a decrease of the speed of seismic waves that is detectable by seismic inversion, traveltime tomography, or velocity analysis. Segments containing gas will have velocities lower than that suggested by the regional trend.

The hierarchical nature of the segment combining in the present inventive method enables a useful type of visualization and analysis. Segments consist of smaller segments. At later stages, segments consist of two or more segments that were earlier combined. The small segments that form a larger one are analyzed separately and the results are combined, correlated, or contrasted. Another method of component-segment analysis is to examine their spatial relationships. Different analyses of segments and their sub-segments yield different measures.

Having one or more measures, for example the disclosed DHI measures or component-segment analysis, for each segment allows high-grading of the relevant ones. Selection criteria include thresholding, ranking, prioritizing, classification, or matching. A first approach might be to apply a threshold to the measures and select all segments either exceeding or undercutting the threshold. Another high-grading method is ranking the segments in accordance to their measures, and then selecting the top ranked segments, the top ten segments for example. A special case of ranking is prioritizing, where all segments are selected but associated with their rank, for example through their label or a database. Subsequent analyses commence with the highest-ranked segment and then go through the segments in accordance to their priorities until a prescribed number of acceptable segments are identified, or until time and/or resource constraints require termination of further activities.

Having one or more measures for each segment also allows determination of appropriate levels of segmentation. Given one or multiple measures or analyses allows, for example, the association of this particular segmentation stage with a measure describing the segmentation at this stage. For the case of entropy, the measures or analyses for the individual segments at a particular stage are scaled and shifted to be positive and to sum up to one. Denoting these shifted and scaled measures as $P_{j,n}$ where j indicates the $j^{th}$ of n segments at this stage, entropy is then defined as $$E_n = -\sum_{j=1}^{n} P_{j,n} \log P_{j,n}.$$

Figure 10:
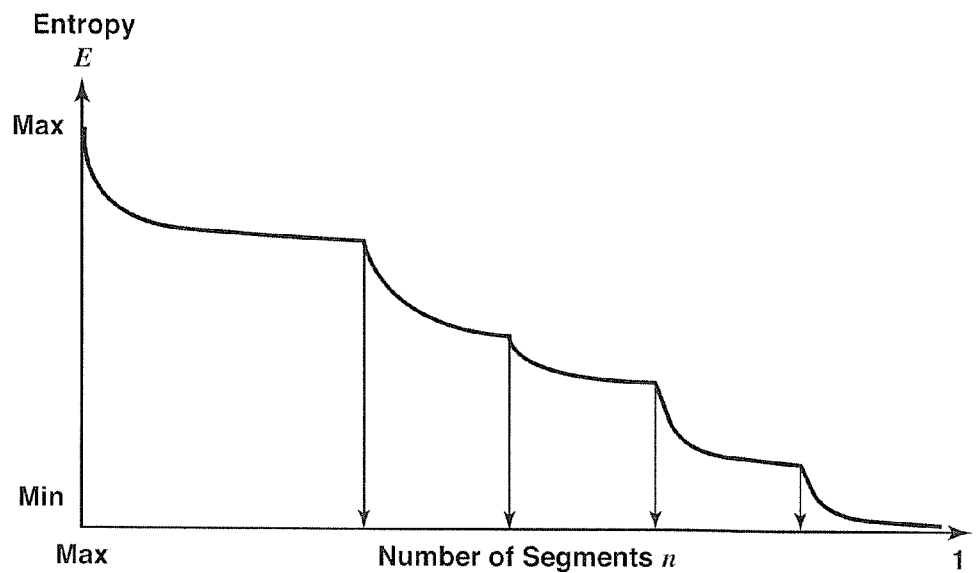
FIG. 10 is a graph showing the behavior of the "entropy" of the number of segments as that number declines through successive stages of pair combination.

At some stages or for some number of segments, entropy will typically exhibit a pronounced change, indicating that the merge that prompted that change may be somewhat more questionable than the preceding merges that tended to produce a more-or-less continuous decline in entropy. FIG. 10 illustrates this with a schematic curve of entropy versus degree (stage) of segmentation, as quantified by the remaining number of segments. At certain stages, indicated in the drawing by arrows, it can be seen that the entropy changes its behavior. These stages may be called characteristic stages, having a characteristic number of segments. In this example, the four characteristic stages could correspond to a segmentation into parasequences, parasequence sets, sequences, and sequence sets.

Segment volume relative to the entire seismic volume is one way to define the shifted and scaled measures for the entropy computation, but any measure shifted to be positive and scaled to sum up to one can be used. Other examples include the relative number of component segments, the relative variability of some attribute inside the segments, or the surface to volume ratio. Moreover, measures other than entropy can be used to characterize or summarize the different segmentation stages. One other example is to compute the statistical significance of a given segmentation stage, i.e., the estimation whether some or all segments at this stage are statistically significantly different or conversely, the estimation of the likelihood that measures or analyses for some or all of the segments at this stage are statistically the same.

EXAMPLES

Figure 11:
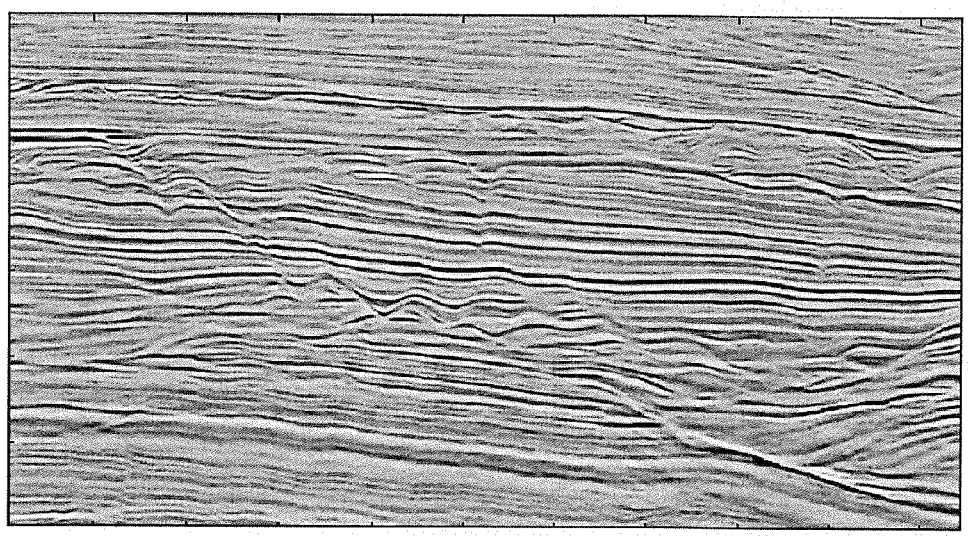
FIG. 11 shows a slice of an example seismic data volume.
Figure 12:
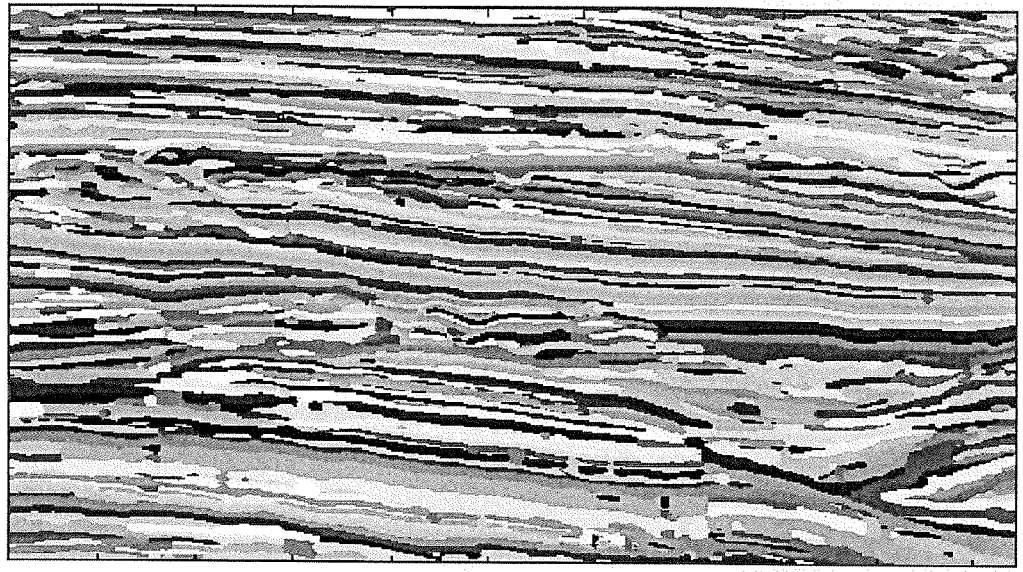
FIG. 12 shows the same slice after initial segmentation of the data volume of FIG. 11.
Figure 13:
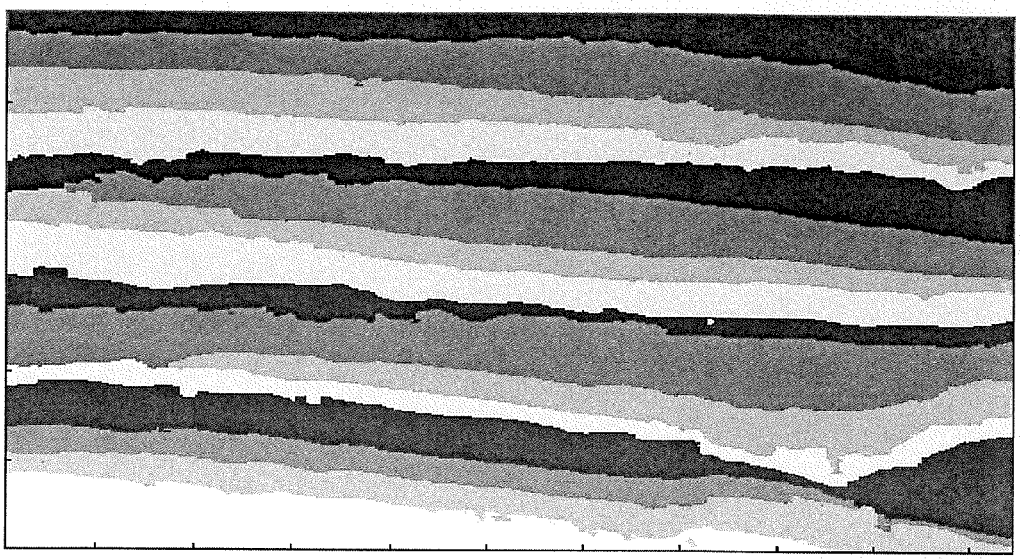
FIG. 13 shows the same slice after the initial 32,974 segments were successively combined by pairs, using the size-guided combination option of the present invention, until only 16 segments (layers) remain.
Figure 14:
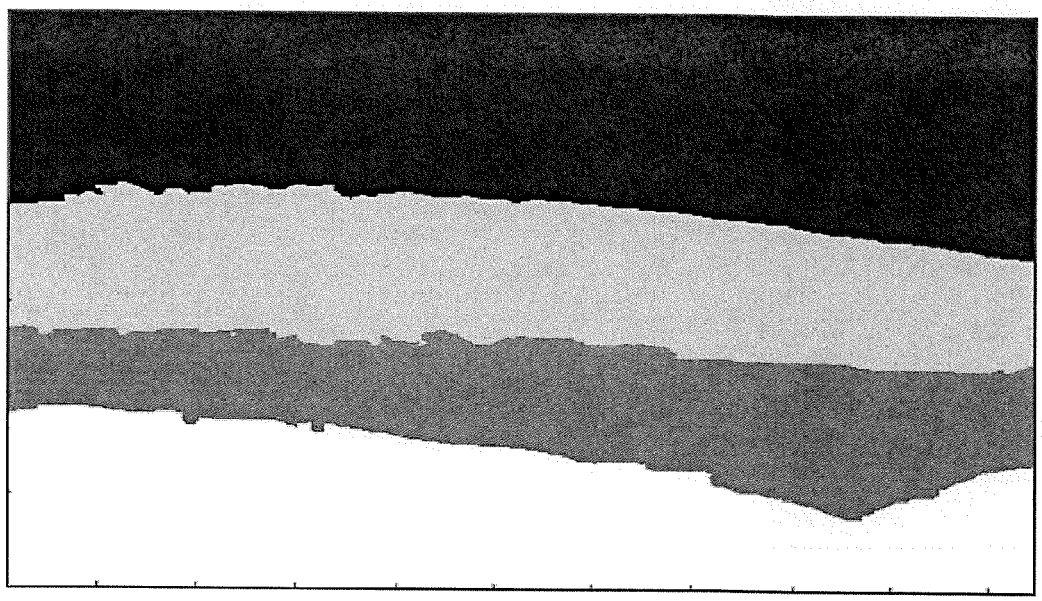
FIG. 14 shows the slice of FIG. 13 after further successive combination of segment pairs until only 4 segments (layers) remain.

The first example is from a seismic dataset with a size of 601·1057·131=83,218,667 voxels. FIG. 11 presents one slice through this dataset, with seismic amplitude values indicated by the gray scale. An initial partitioning based on polarity, followed by connectivity analysis and splitting of large, topologically inconsistent components yielded an initial segmentation with 32,974 segments. FIG. 12 shows a slice at the same location through the initial segmentation volume. The gray scale used to satisfy patent requirements has been repeated (wrapped) multiple times over in an attempt to delineate the vast number of initial segments. Using the size-guided option for performing the segment combination of step 13, the currently smallest segment is combined with its smallest neighbor, and this process is repeated until all segments are combined. FIGS. 13 and 14 show the slice trough the data volume at the segment combination stages with 16 and 4 remaining segments or layers, respectively.

Figure 15:
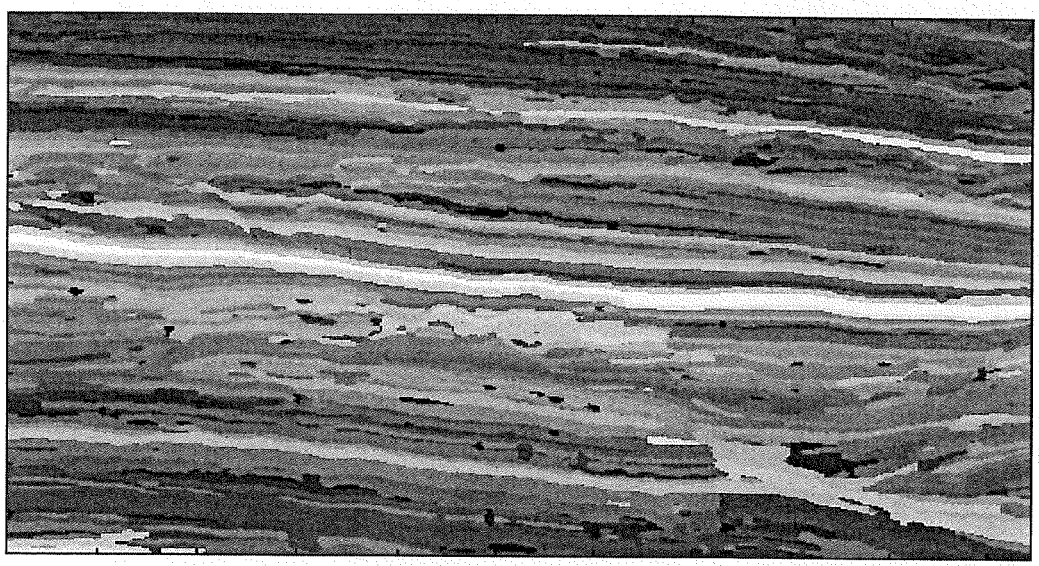
FIG. 15 displays average instantaneous amplitude for the initial segments of FIG. 12.
Figure 16:
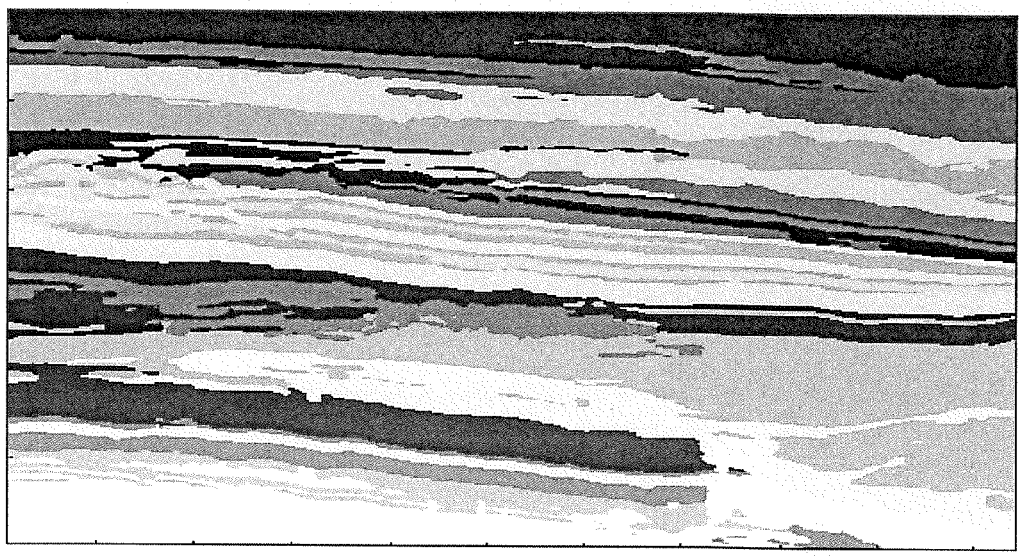
FIG. 16 shows the data volume slice after the attribute-guided option is used to combine the initial segments of FIG. 12 until only 16 segments (layers) remain, wherein the guiding attribute is average instantaneous amplitude from FIG. 15.

Segmentation of the FIG. 11 data volume was then performed twice more, using different Step 13 segment combination options. Using instantaneous amplitude (shown in FIG. 15) as the attribute, the initial segmentation of FIG. 12 is progressively combined with the attribute-guided option where the currently smallest segment is combined with its most similar neighbor. FIG. 16 shows the stage of 16 remaining segments. The segmentation is interfingered and not as layered as the size-guided result in FIG. 13.

Figure 17:
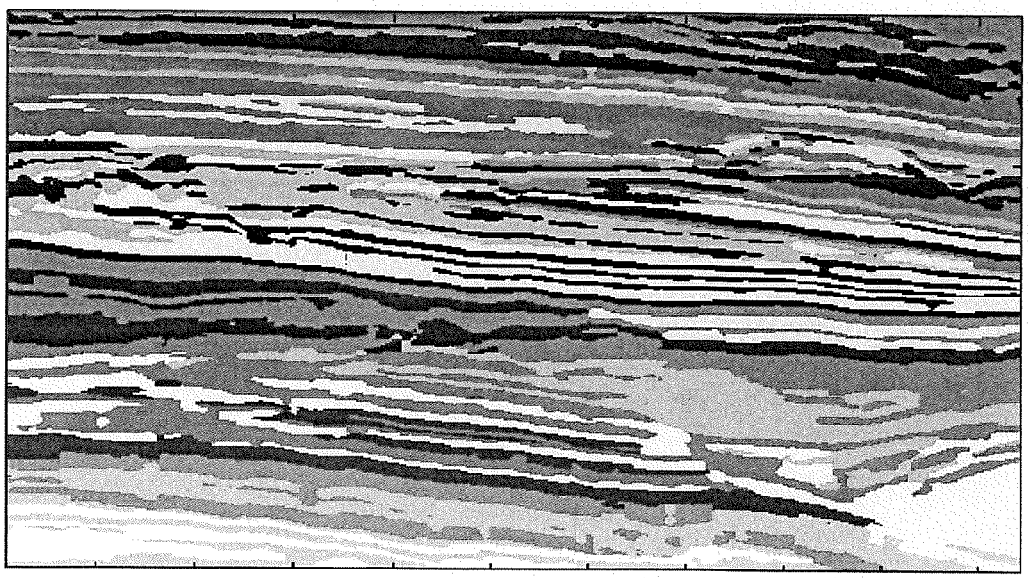
FIG. 17 shows the data volume slice after a hybrid option is used to combine the initial segments of FIG. 12 until only 16 segments (layers) remain, wherein size-guided combination is used to develop a mask which is then used to constrain attribute-guided combination.

Finally, FIG. 17 presents the 16 segments stage obtained with a hybrid combinatorial option. First, the size-guided option is used to combine the initial segmentation to 4 gross layers. Second, these gross layers are used as masks to restrict the segment growth when using the attribute-guided option to combine the initial segmentation into 16 remaining segments.

Figure 18:
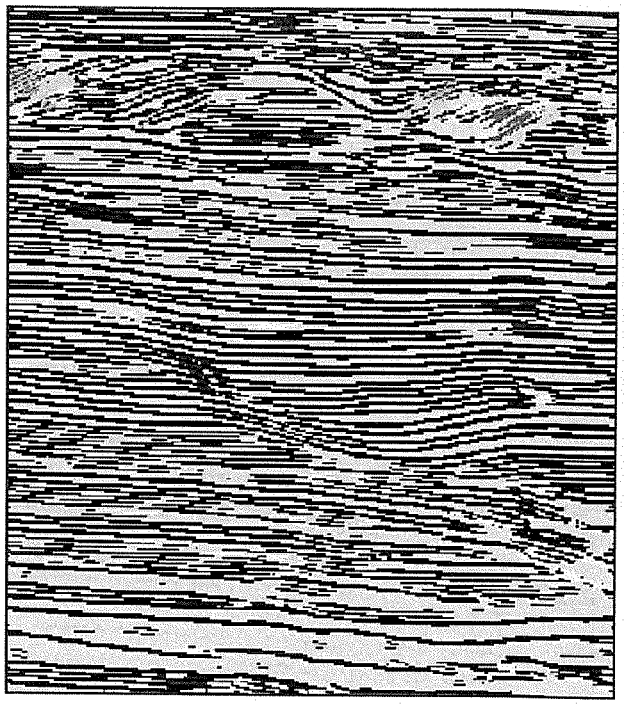
FIG. 18 shows a slice view of initial segmentation of a second example seismic data volume.
Figure 19:
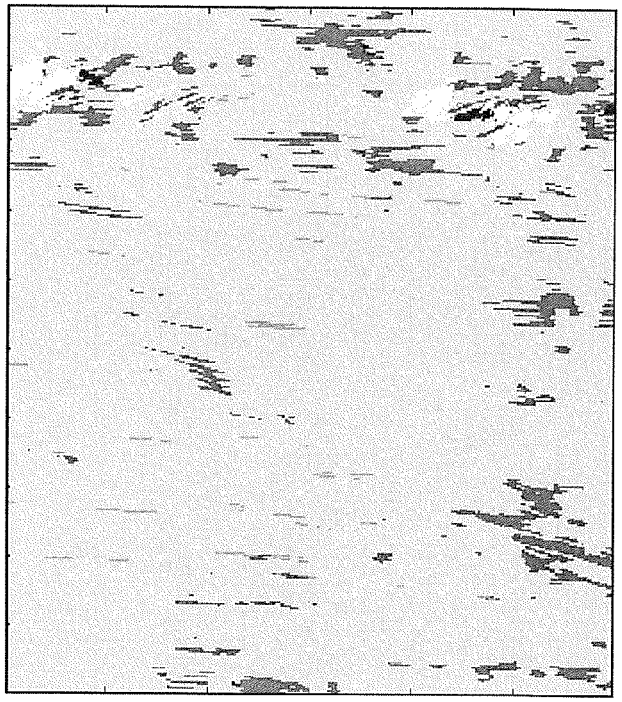
FIG. 19 shows the data volume slice of FIG. 18 after the number of segments has been reduced to five by progressive concurrence-based combination.

A second example application of the present inventive method demonstrates the concurrence-based option for combining segment pairs, using a seismic data volume with a size of 501·301·71 voxels. FIG. 18 shows an initial segmentation that contains 41 different classes of segments. There are more segments than classes because the segments do not need to be connected or contiguous. After computation of the concurrence table that states how often the different segment classes border each other, the segment classes are progressively combined using the unweighted concurrence table. FIG. 19 shows the stage with five remaining segment classes (indicated by different shades of gray) where there are more than five segments because individual segment classes are not required to form contiguous bodies.

Figure 20:
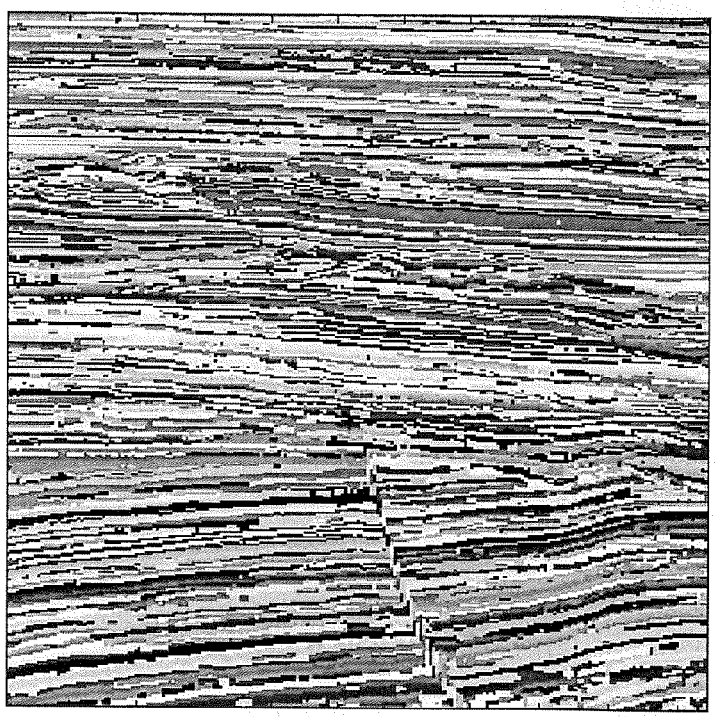
FIG. 20 shows a slice view of initial segmentation of a third example seismic data volume.
Figure 21:
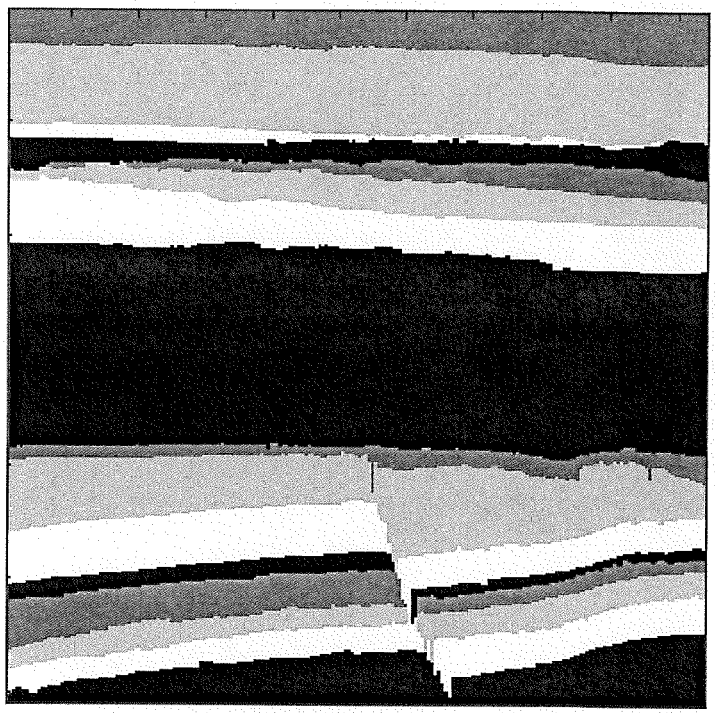
FIG. 21 shows the data volume slice of FIG. 20 after the number of segments has been reduced to sixteen by progressive extrema-based combination.

The last example application demonstrates extrema-based combination using a seismic dataset with a size of 1226·211·131 voxels. The initial segmentation containing 71,796 segments is shown in FIG. 20. The progression of the segment areas under progressive smoothing is shown in FIG. 4, which also shows some of the more relevant extrema in the area versus segment or sequence number graph. Finally, FIG. 21 shows the portioning of the initial segmentation (FIG. 20) to 16 segments or layers using extrema-based combination.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for analyzing a geophysical data volume obtained or derived from a geophysical survey of a subsurface region to determine physical structure of the subsurface region, comprising: (a) dividing the data volume into a plurality N of initial segments, at least one segment being greater than one voxel in size, a voxel being a single data point in the data volume;
   (b) successively combining pairs of segments until the number of segments is reduced to a selected number M, where M<N;
   (c) creating a record of hierarchical multiresolution segmentations by recording stages of successively combined pairs from the plurality of N initial segments to the reduced number of M segments;
   (d) analyzing some or all of either the M segments, or segments from an intermediate stage of combination, to interpret subsurface physical structure, wherein the analyzing includes zooming in and out of the geophysical data volume by using the stages of the successively combined pairs that were recorded to retrieve and display at least one image of the geophysical data volume with a number of segments ranging from the N initial segments to the M segments;
   (e) evaluating the interpreted subsurface physical structure within the displayed at least one image for hydrocarbon accumulations; and
   (f) causing a well to be drilled;
   wherein analyzing the M segments comprises highgrading, ranking, or prioritizing the M segments based on one or more measures selected from geometrical properties of an arrangement of pixels that form the M segments in the at least one image, direct hydrocarbon indicators, and collocated property measures that are built by querying a seismic or attribute dataset at locations within the seismic or attribute data set that are collocated with locations of the M segments in the geophysical data volume, and wherein the method further comprises using the one or more measures after a plurality of stages of combination to stop the successively combining pairs of segments.

2. The method of claim 1, wherein the initial segments are topologically consistent, wherein two segments are topologically consistent if they satisfy at least one of (i) no self overlaps; (ii) local consistency; and (iii) global consistency; and wherein
   local consistency means that one segment cannot be above a second segment at one location but beneath it at another; and
   global consistency means that three or more segments must preserve no-overlap transitivity.

3. The method of claim 2, wherein segments through the combining are topologically consistent, meaning that combinations that would violate topological consistency are not performed;
   wherein a combination is topologically consistent if it satisfies at least one of (i) no self overlap; (ii) local consistency; and (iii) global consistency; and wherein
   local consistency means that the combination cannot be above a second combination or an uncombined segment at one location but beneath the second combination or uncombined segment at another; and
   global consistency means that the combination and two or more other combinations or uncombined segments must preserve no-overlap transitivity.

4. A method for analyzing a geophysical data volume obtained or derived from a geophysical survey of a subsurface region to determine physical structure of the subsurface region, comprising:

(a) dividing the data volume into a plurality N of initial segments, at least one segment being greater than one voxel in size, a voxel being a single data point in the data volume;

(b) successively combining pairs of segments until the number of segments is reduced to a selected number M, where M<N;

(c) analyzing some or all of either the M segments, or segments from an intermediate stage of combination, to interpret subsurface physical structure;

(d) evaluating the interpreted subsurface physical structure for hydrocarbon accumulations, wherein the combining is performed by successive combination of a smallest segment with its smallest neighbor; and (e) causing a well to be drilled;

wherein analyzing the M segments comprises highgrading, ranking, or prioritizing the M segments based on one or more measures selected from geometrical properties of an arrangement of pixels that form the M segments in the at least one image, direct hydrocarbon indicators, and collocated property measures that are built by querying a seismic or attribute dataset at locations within the seismic or attribute data set that are collocated with locations of the M segments in the geophysical data volume, and wherein the method further comprises using the one or more measures after a plurality of stages of combination to stop the successively combining pairs of segments.

5. The method of claim 4, wherein segment size and neighborhoods are determined only once and recorded in tables that are updated after each stage of the successive combining.

6. The method of claim 4, wherein neighbor is restricted to lateral neighbor at one or more selected stages of combining, or neighbor is restricted to vertical neighbor at one or more selected stages of combining.

7. The method of claim 1, wherein combining pairs of segments comprises:

sequencing the initial segments by a selected sequence rule;

graphing sequential sequence number vs. segment size;

smoothing the graph a plurality of times and tracking segment number boundaries that survive and those that vanish at each smoothing stage; and using order of vanishing of boundaries to determine order of combining corresponding pairs of segments.

8. A method for analyzing a geophysical data volume obtained or derived from a geophysical survey of a subsurface region to determine physical structure of the subsurface region, comprising:

(a) dividing the data volume into a plurality N of initial segments, at least one segment being greater than one voxel in size, a voxel being a single data point in the data volume;

(b) successively combining pairs of segments until the number of segments is reduced to a selected number M, where M<N;

(c) analyzing some or all of either the M segments, or segments from an intermediate stage of combination, to interpret subsurface physical structure;

(d) evaluating the interpreted subsurface physical structure for hydrocarbon accumulations, wherein each segment pair that is combined are most similar neighbors, and similarity is based on value for each segment of a selected attribute of the geophysical data, and wherein each segment pair that is combined also contains the currently smallest segment; and (e) causing a well to be drilled;

wherein analyzing the M segments comprises highgrading, ranking, or prioritizing the M segments based on one or more measures selected from geometrical properties of an arrangement of pixels that form the M segments in the at least one image, direct hydrocarbon indicators, and collocated property measures that are built by querying a seismic or attribute dataset at locations within the seismic or attribute data set that are collocated with locations of the M segments in the geophysical data volume, and wherein the method further comprises using the one or more measures after a plurality of stages of combination to stop the successively combining pairs of segments.

9. The method of claim 1, wherein distance between two segments is used as a factor to favor or disfavor combination of the two segments.

10. The method of claim 1, wherein connectivity between two segments is used as a factor to favor or disfavor combination of the two segments.

11. A method for analyzing a geophysical data volume obtained or derived from a geophysical survey of a subsurface region to determine physical structure of the subsurface region, comprising:

(a) dividing the data volume into a plurality N of initial segments, at least one segment being greater than one voxel in size, a voxel being a single data point in the data volume;

(b) successively combining pairs of segments until the number of segments is reduced to a selected number M, where M<N;

(c) analyzing some or all of either the M segments, or segments from an intermediate stage of combination, to interpret subsurface physical structure;

(d) evaluating the interpreted subsurface physical structure for hydrocarbon accumulations, wherein sequence of combination of segment pairs is based on concurrence, meaning extent of each pair's common boundary, and wherein concurrence values are weighted by a selected weighting function; and (e) causing a well to be drilled;

wherein analyzing the M segments comprises highgrading, ranking, or prioritizing the M segments based on one or more measures selected from geometrical properties of an arrangement of pixels that form the M segments in the at least one image, direct hydrocarbon indicators, and collocated property measures that are built by querying a seismic or attribute dataset at locations within the seismic or attribute data set that are collocated with locations of the M segments in the geophysical data volume, and wherein the method further comprises using the one or more measures after a plurality of stages of combination to stop the successively combining pairs of segments.

12. A method for analyzing a geophysical data volume obtained or derived from a geophysical survey of a subsurface region to determine physical structure of the subsurface region, comprising:

(a) dividing the data volume into a plurality N of initial segments, at least one segment being greater than one voxel in size, a voxel being a single data point in the data volume;

(b) successively combining pairs of segments until the number of segments is reduced to a selected number M, where M<N;

(c) analyzing some or all of either the M segments, or segments from an intermediate stage of combination, to interpret subsurface physical structure;

(d) evaluating the interpreted subsurface physical structure for hydrocarbon accumulations, wherein at least two different methods for selecting pairs of segments to combine are used in reducing from N segments to M segments; and (e) causing a well to be drilled;

wherein analyzing the M segments comprises highgrading, ranking, or prioritizing the M segments based on one or more measures selected from geometrical properties of an arrangement of pixels that form the M segments in the at least one image, direct hydrocarbon indicators, and collocated property measures that are built by querying a seismic or attribute dataset at locations within the seismic or attribute data set that are collocated with locations of the M segments in the geophysical data volume, and wherein the method further comprises using the one or more measures after a plurality of stages of combination to stop the successively combining pairs of segments.

13. The method of claim 12, wherein a first method is used for combining pairs until a selected stage of combination is reached, then the segments defined at that stage of combination are used as masks to constrain a successive combining of the N initial segments using a second method of combining.

14. The method of claim 1, wherein determining an optimum stage of combination for analysis comprises using said one or more measures to compute an entropy value for each of the plurality of stages, and then using the entropy values to stop the successively combining pairs of segments.

15. The method of claim 1, wherein analyzing the M segments comprises analyzing small segments combined to form larger ones, and combining, correlating or contrasting results.

16. The method of claim 1, wherein in the combining pairs of segments, each segment can be combined only with one of a prescribed list of neighbors.

17. The method of claim 1, wherein the method is computer implemented, and at least the successively combining pairs of segments is performed using the computer.

18. The method of claim 1, wherein interpreting the subsurface physical structure comprises searching a segment display for indication of one or more geobodies that potentially represent hydrocarbon accumulations.

19. The method of claim 1, wherein the measure is the direct hydrocarbon indicators.

20. The method of claim 1, wherein the measure is the geometrical properties of an arrangement of pixels that form the M segments in the at least one image.

21. The method of claim 1, wherein the measure is the collocated property measures that are built by querying a seismic or attribute dataset at locations within the seismic or attribute data set that are collocated with locations of the M segments in the geophysical data volume.

* * * * *